United States Patent [19]

Ilon

[11] Patent Number: 4,598,782

[45] Date of Patent: Jul. 8, 1986

[54] DEVICE FOR EXPLOITING THE MAXIMUM DRIVE UNIT TORQUE OF THE DRIVES OF VEHICLES OR CONVEYERS

[75] Inventor: Bengt E. Ilon, Meggen, Sweden

[73] Assignee: Mecanum Innovation AB, Umea, Sweden

[21] Appl. No.: 639,349

[22] Filed: Aug. 10, 1984

[30] Foreign Application Priority Data

Aug. 16, 1983 [SE] Sweden ................ 8304423

[51] Int. Cl.$^4$ ............................................ B62D 57/00
[52] U.S. Cl. ................................ 180/7.1; 180/6.5; 180/140; 180/333
[58] Field of Search ............... 180/6.5, 6.48, 7.1, 180/7.2, 333, 140; 74/471 XY

[56] References Cited

U.S. PATENT DOCUMENTS

| | | | |
|---|---|---|---|
| 3,255,840 | 6/1966 | Tangen | 180/140 X |
| 3,666,034 | 5/1972 | Stuller et al. | 180/6.48 |
| 3,746,112 | 7/1973 | Ilon | 180/7.2 |
| 3,874,468 | 4/1975 | Chatterjea | 180/6.5 |
| 3,876,255 | 8/1975 | Ilon | 301/5 P |
| 3,970,160 | 7/1976 | Nowick | 180/6.5 |
| 4,036,321 | 7/1977 | Habiger | 180/6.48 |
| 4,237,990 | 12/1980 | La | 180/7.1 |
| 4,449,598 | 5/1984 | Hones et al. | 180/6.5 |
| 4,483,405 | 11/1984 | Noda et al. | 180/6.5 |
| 4,486,694 | 12/1984 | Ohba et al. | 180/6.5 |
| 4,511,825 | 4/1985 | Klimo | 180/6.5 |

FOREIGN PATENT DOCUMENTS

| | | |
|---|---|---|
| 1196244 | 6/1970 | United Kingdom . |
| 1361019 | 7/1974 | United Kingdom . |
| 1408820 | 10/1975 | United Kingdom . |
| 1477847 | 6/1977 | United Kingdom . |

Primary Examiner—Albert J. Makay
Assistant Examiner—Steven E. Warner
Attorney, Agent, or Firm—Schwartz, Jeffery, Schwaab, Mack, Blumenthal & Evans

[57] ABSTRACT

This invention relates to a device for exploiting the maximum drive unit torque of the drives of vehicles (35) or conveyers, which vehicles (35) are movable in an optional direction or which conveyers permit transport of objects in an optional direction, the vehicle (35) or the conveyer having at least two driven means (H1, H2, H3, H4) with oblique ground contact elements (41), the driven means being driven by a drive comprising one or more drive units (36-39). To be able to exploit the full power of the drives of vehicles of this type in its entirety, the device in question is characterized in that the maximum speed of the vehicle (35) and the conveyer, respectively, is limited upon travel and conveyance, respectively, in a travelling/conveying direction deviating from a direction substantially parallel and/or perpendicular to the drive shafts (43) of the driven means (H1-H4), in which travelling/conveying direction the vehicle (35) and the conveyer, respectively, can attain its maximum travelling/conveying speed.

4 Claims, 7 Drawing Figures

FIG. 4
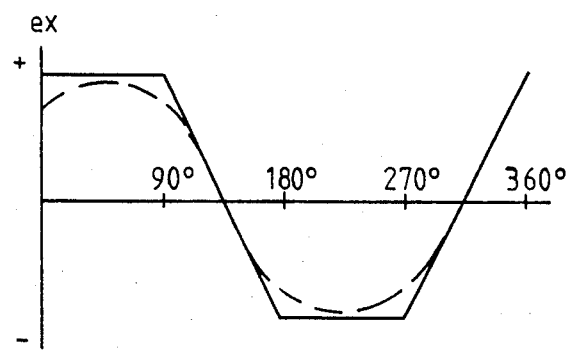
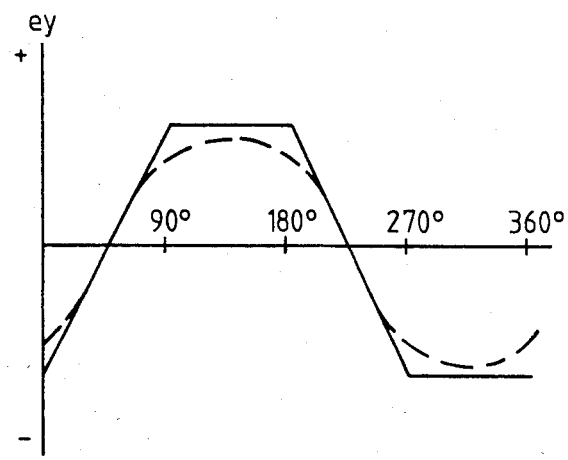
FIG. 5

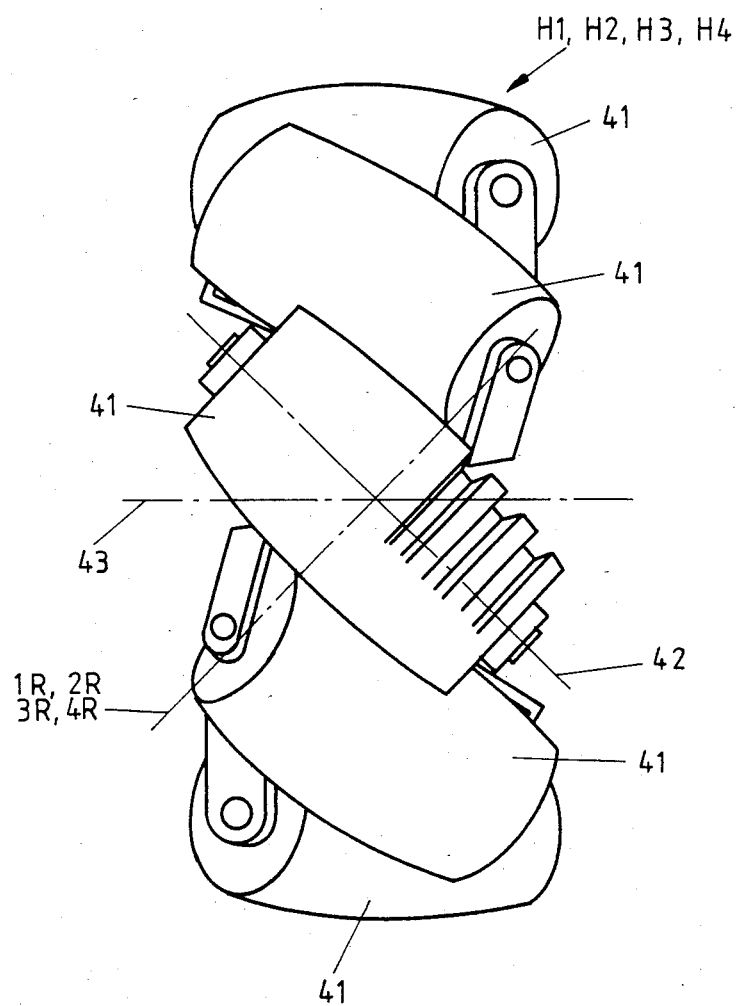

DEVICE FOR EXPLOITING THE MAXIMUM DRIVE UNIT TORQUE OF THE DRIVES OF VEHICLES OR CONVEYERS

This invention relates to a device and in particular a steering device, for exploiting the maximum drive unit torque of the drives of vehicles or conveyers, which vehicles are movable in optional directions or which conveyers permit transport of objects in optional directions, the vehicles or the conveyer having at least two driven means with oblique ground contact elements, and said driven means being driven by a drive comprising one or more drive units.

To be able to drive a vehicle of the type in question in certain directions deviating from a main travelling direction, say straight ahead, one or more driven means must be driven at a higher speed than if the vehicle is to be driven in a main direction at the same speed. Thus, the drive must be dimensioned such that it can impart to the driven means such a maximum torque that full speed can be attained in the travelling directions deviating from the main travelling direction. Such dimensioning of the drive cannot, however, be made use of to the full in the main travelling directions, which is unsatisfactory since one's aim is primarily to exploit the full power of the drive in the main directions.

The object of the present invention is to eliminate this problem, i.e. to provide a device which allows utilizing the full power of the drive upon travel in the main travelling directions. This is achieved by the steering device of the present invention which controls the traveling direction and speed of drive units for individual driving of the driven elements of the vehicle.

The invention is elucidated in more detail below reference being made to the accompanying drawings in which:

FIGS. 4 and 5 are curve charts relating to control signals;

FIG. 7 shows the driven means in FIG. 6 as seen from in front.

Figure 1:
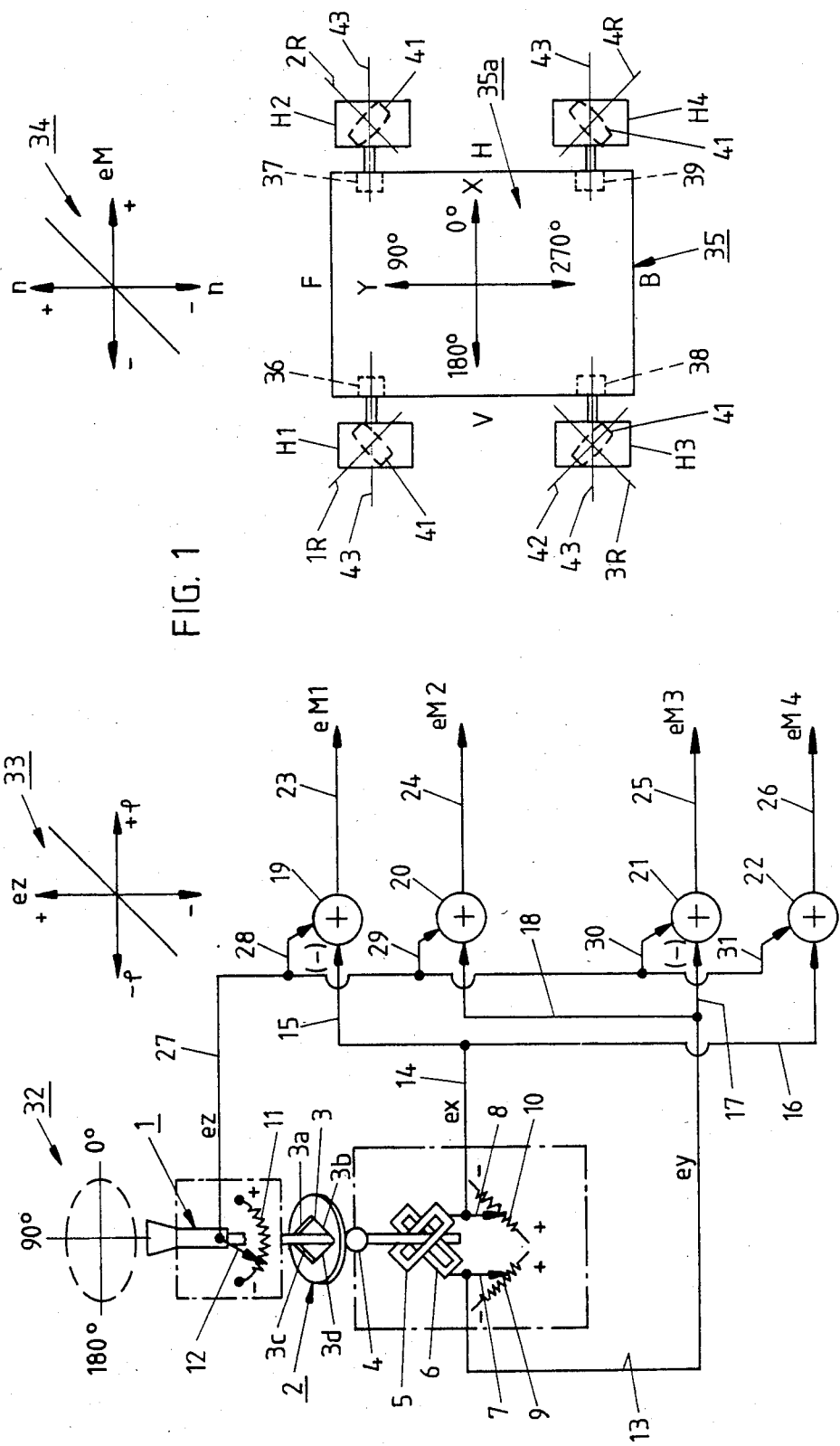
FIG. 1 shows a device according to the invention in neutral position.

In the drawings, there is shown a steering device having a steering lever 1 upstanding through a limitation opening 3 in a guide plate 2. The limitation opening 3 forms four limitation edges 3a, 3b, 3c and 3d. The steering lever is mounted in a fulcrum 4 beneath the guide plate and cooperates with two guideways 5 and 6 disposed crosswise. The guideway 5 cooperates with a resistance path 10 via a runner 8, while the guideway 6 cooperates with a resistance path via runner 7. By turning the steering lever 1 in the fulcrum 4 the runners 7 and 8 can be moved along their resistance paths 9, 10. The steering lever 1 also cooperates with a resistance path 11 via a runner 12 which moves along the resistance path 11 when the steering lever 1, is turned about its longitudinal axis. In the FIGS. 19 designates a comparator, 20 an adder, 21 a comparator and 22 an adder. Various signal leads are designated 23, 24, 25, 26, 27 28, 29, 30 and 31. Reference numeral 32 designates a steering direction scale, reference numeral 33 a scale showing the relation between the turning deflection and rotation signal of the steering lever 1, reference numeral 34 a scale showing the relation between the torque of the drive wheels and the steering signal $e_M$, and reference numeral 35a a travelling direction scale. Moreover, in the drawings, $e_z$ designates a signal for rotation, $e_x$ a signal for steering diagonally 45° or 225°, $e_y$ a signal for steering diagonally 135° or 315°, $e_M$ a control signal for the torque of the wheels, $\rho$ the turning deflection of the steering lever, and n the torque of the wheels. The comparator 19 is adapted to deliver an output signal $e_{M1}$ equal to the difference between $e_x$ and $e_z$. The adder 20 is adapted to deliver an output signal $e_{M2}$ equal to the sum of $e_y$ and $e_z$. The comparator 21 is adapted to deliver a signal $e_{M3}$ equal to the difference between $e_y$ and $e_z$, and the adder 22 is adapted to deliver an output sinal $e_{M4}$ equal to the sum of $e_x$ and $e_z$.

Figure 6:
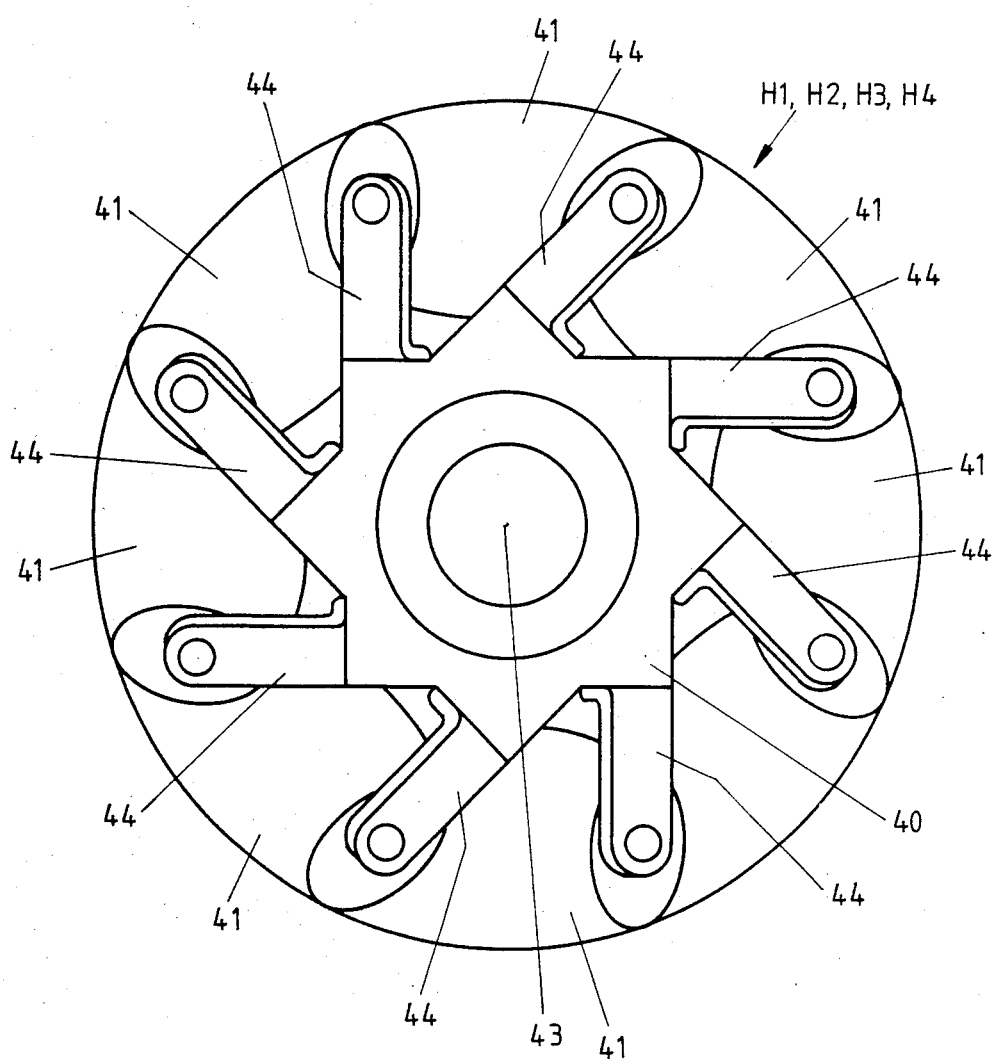
FIG. 6 shows a driven means of the vehicle according to FIG. 1 to 3 in side view.

Said steering device is built into a vehicle 35 having a drive comprising four drive units 36, 37, 38 and 39 for individual driving of the wheels H1, H2, H3 and H4. Each such wheel H1–H4 is illustrated in more detail in FIGS. 6 and 7 and comprises a wheel body 40 and a plurality of rollers 41 distributed about the periphery of the wheel body 40 and serving as ground contact elements, the shafts 42 of said rollers being disposed obliquely to the drive shaft 43 of the wheel body 40. Each roller 41 is mounted on the body 40 by means of two holders 44. The wheels H1 and H2 are so disposed on the vehicle 35 that their roller axes 1R and 2R, which are perpendicular to the roller shafts 42, intersect inside said wheels H1 and H2, while the wheels H3 and H4 are so disposed that their roller axes 3R and 4R, which are perpendicular to the roller shafts 42, intersect inside said wheels H3 and H4. Such an arrangement of the drive wheels and their rollers is disclosed in Swedish Patent 363 781, and the main travelling directions of the vehicle 35 are designated F, V, B and H. Thus, F designates the travelling direction forward, B the travelling direction rearward, V the travelling direction to the left, and H the travelling direction to the right. On the travelling direction scale 35, the travelling direction straight forward F is designated 90°, the travelling direction B straight rearward 270°, the travelling direction V straight to the left 180°, and the travelling direction H straight to the right 0°.

Figure 2:
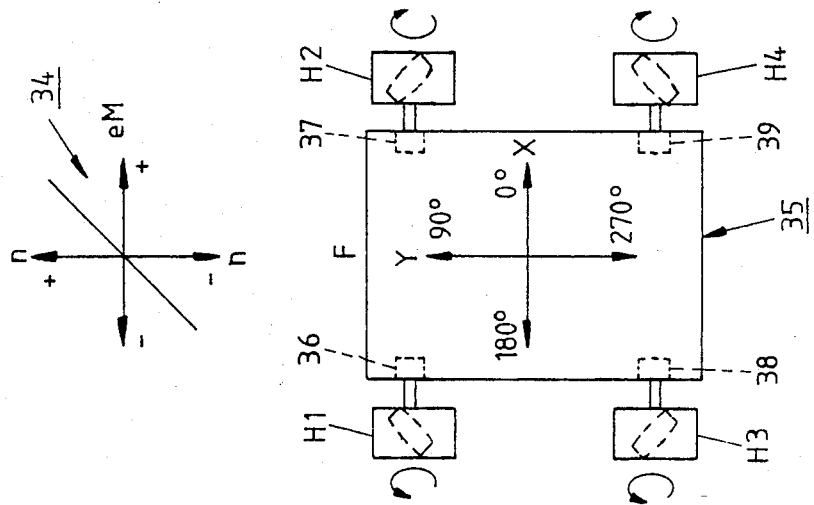
FIG. 2 shows the device according to the invention upon travel straight ahead.
Figure 2:
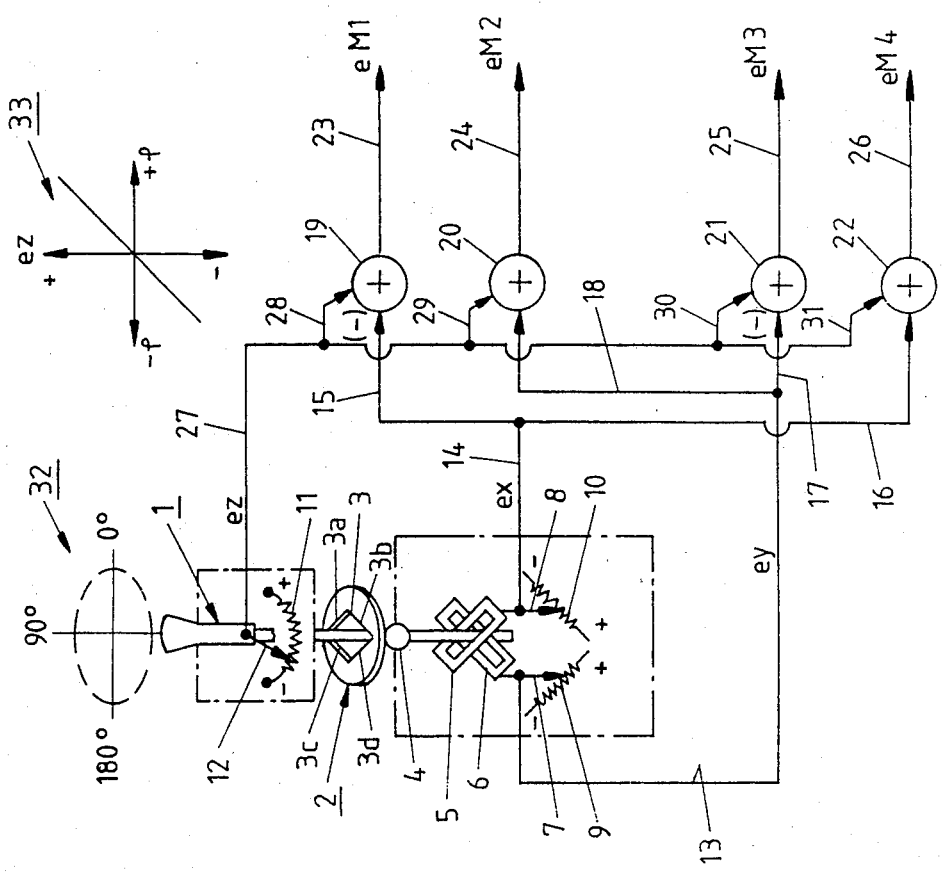

Upon travel straight ahead the steering lever is moved, from neutral position according to FIG. 1, forward in the direction 90° according to FIG. 2, the maximum deflection of the lever being limited by the edges 3a and 3c of the limitation opening 3 in the guide plate 2. The lower shank end of the steering lever 1 moves the guideways 5, 6 such that the runners 7, 8 are moved along the resistance paths 9, 10 toward the end positions which are marked by (+) plus polarity.

From the runner 8 on the resistance path 10 of the steering lever 1 there is obtained the signal $e_x$ for steering in direction 45° or 225°. The signal $e_x$, which in this case is positive, is coupled by the signal leads 14, 15 to one input of the comparator 19. The signal $e_z$ for rotation is coupled to the other input. In this case, that signal equals 0 (no rotation). The output signal $e_{M1}$ from the comparator 19 is equal to the difference between the two input signals $e_z$ and $e_x$.

In this instance, thus $e_{m1} = e_z - e_x = 0 - e_x$. Said signal ($e_{M1}$) gives the torque at counter-clockwise rotation for wheel H1.

The signal $e_x$ is also coupled by the signal leads 14, 16 to one input of the adder 22. The signal $e_z$ for rotation is coupled to the other input. That signal in this instance equals 0. The output signal $e_{M4}$ from the adder 22 is equal to the sum of the signals $e_z$ and $e_x$. In this instance, thus $e_{M4}=e_z+e_x=0 +e_x$. Said signal $e_{M4}$ gives the torque at clockwise rotation for wheel H4.

From the runner 7 on the resistance path 9 of the steering lever 1 there is obtained the signal $e_y$ for steering diagonally in direction 135° or 315°. The signal $e_y$, which in this case is positive, is coupled by the signal leads 13, 17 to one input of the comparator 21. The signal $e_z$ for rotation is coupled to the other input. In this case, that signal equals 0 (no rotation). The output signal $e_{M3}$ from the comparator 21 is equal to the difference between the two input signals $e_z$ and $e_y$. In this instance, thus $e_{M3}=e_z-e_y=0-e_y$. Said signal $e_{M3}$ gives the torque at counter-clockwise rotation for wheel H3.

The signal $e_y$ is also coupled by the signal leads 13, 18 to one input of the adder 20. The signal $e_z$ for rotation is coupled to the other input. That signal in this instance equals $=0$. The output signal $e_{M2}$ from the adder 20 is equal to the sum of the signals $e_z$ and $e_y$. In this instance, thus $e_{M2}=e_z+e_y=0+e_y$. This signal $e_{M2}$ gives the torque at counterclockwise rotation for wheel H2. The result of the cooperation between the four wheels H1, H2, H3 and H4 will be that the vehicle 35 travels straight ahead (the wheel H1–H4 rotate as shown by the arrows in FIG. 2).

From the runner 12 on the resistance path of the steering lever there is obtained the signal $e_z$ for rotation. The signal $e_z$ is coupled by the signals leads 27, 28, 29, 30 and 31 to the comparators 19 and 21 as well as to the adders 20 and 22. Upon clockwise rotation of the steering lever the signals $e_{M1}$ and $e_{M3}$ increase such that the torques of wheels H1 and H3 increase. At the same time, the signals $e_{M2}$ and $e_{M4}$ decrease such that the torques of wheels H2 and H4 decrease. This results in the vehicle 35 making a right-hand turn. Upon counterclockwise turning of the steering lever 1 the signals $e_{M2}$ and $e_{M4}$ increase such that the torques of wheels H2 and H4 increase. At the same time, the signals $e_{M1}$ and $e_{M3}$ decrease such that the torques of wheels H1 and H3 decrease. This results in the vehicle 35 making a left-hand turn.

Figure 3:
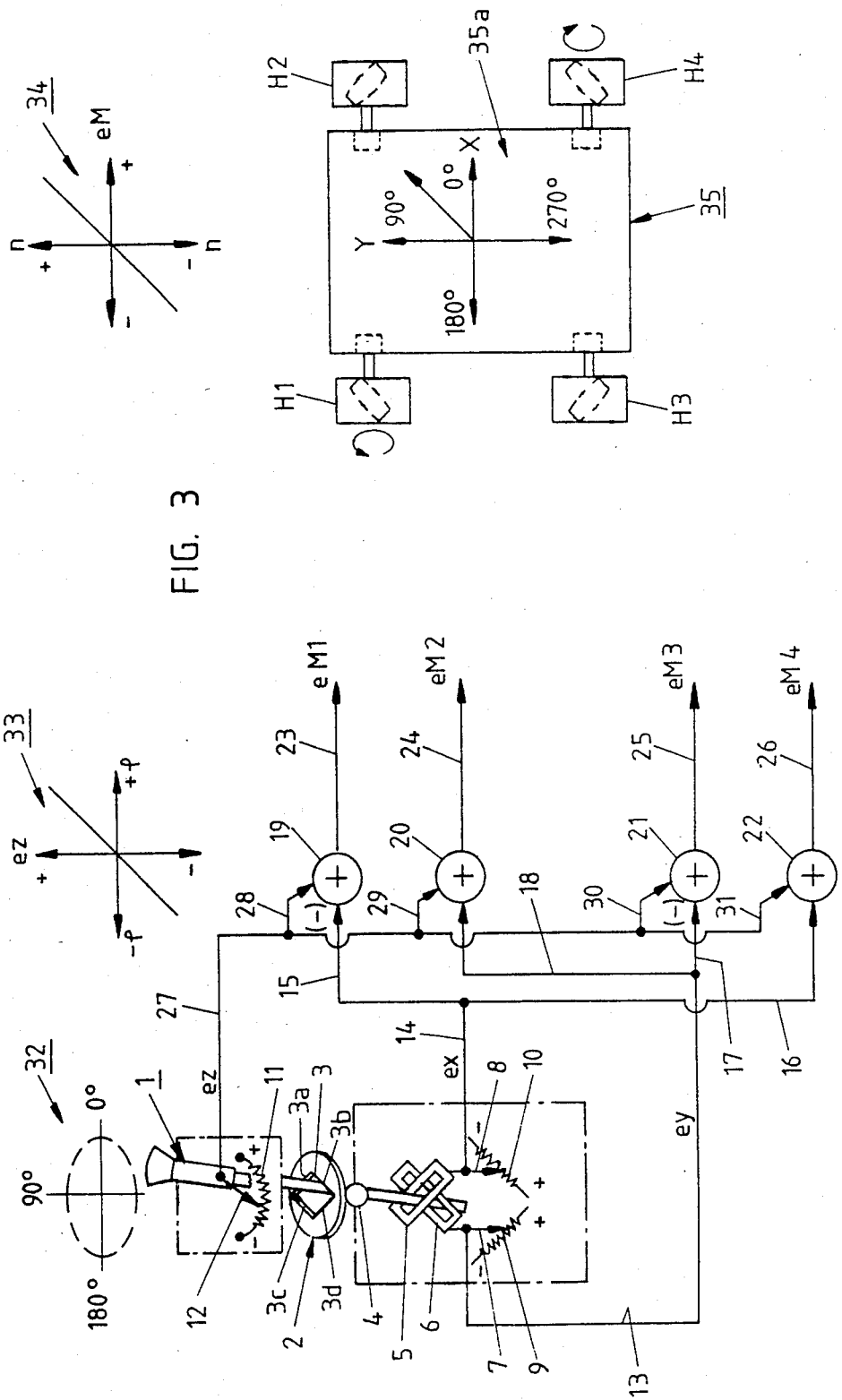
FIG. 3 shows the device according to the invention upon travel obliquely forward/to the right.

Upon travel obliquely forward to the right the steering lever is moved in direction 45° according to FIG. 3, its maximum deflection being limited by the edge 3a in the guide plate 2. When the steering lever 1 is moved in direction 45° the runner 8 moves along the resinstance path 10 toward the end position marked by (+) plus polarity, but the runner 7 is not affected because of the design of the guideways 5, 6. The runner 7 thus remains at the center of the resistance path 9, i.e. in zero position.

The signal $e_{M1}$ gives the torque at counter-clockwise rotation for wheel H1 and the signal $e_{M4}$ gives the torque at clockwise rotation for wheel H4. The signal $e_y$ equals 0 when the runner 7 is at the center of the reistance path 9. As a result, the signals $e_{M2}$ and $e_{M3}$ for the respective wheels H2 and H3 equal 0. Wheel H2 and wheel H3 thus are at standstill, and the result of the cooperation between the four wheels will be that the vehicle 35 travels obliquely forward/to the right. If, upon travel obliquely forward/to the right (45°), one moves the steering lever 1 toward the direction straight ahead (90°), the steering mechanism adjusts itself as follows:

The lower shank end of the steering lever 1 actuates the guideways 5, 6 such that the runner 7 is moved from the center of the resistance path 9 (zero position) toward the end position marked by (+) plus polarity. The runner 8 is not affected and remains in the end position (+) on the resistance path 10.

The signal course of signal $e_x$ from the runner 8 is unaltered and wheels H1 and H4 thus retain the same torque and direction of rotation as before. The signal course of signal $e_y$ from the runner 7 is the same as upon travel straight ahead (90°).

In travelling direction 45°, signal $e_y$ equals 0. The signals $e_{M2}$ and $e_{M3}$ then also equal 0 and wheels H2 and H3 are at standstill. While the steering lever 1 is moved from direction 45° toward 90° the signal $e_y$ changes from zero in positive direction when the runner 7 is moved toward its end position (+). The signal $e_{M2}$ changes from zero in positive direction and wheel H2 begins to rotate clockwise with increasing torque. The signal $e_{M3}$ changes from zero in negative direction and wheel H3 begins to rotate counter-clockwise with increasing torque. The result of the cooperation between the four wheels will be that the travelling direction of the vehicle 35 successively changes from obliquely forward/to the right to straight ahead.

The full-line curve in FIGS. 4 and 5 show how the size of signals $e_x$ and $e_y$ changes when, with maximum deflection of the steering lever 1, one moves its direction a full time round (from 0° to 360°). The appearance of the curves will thus be dependent upon the shape of the limitation edges 3a, 3b, 3c and 3d. The resistance paths 9 and 10 being physically placed at right angles to one another, the curves for $e_x$ and $e_y$ are offset 90° in relation to one another.

The inserted broken-line curve shows how the size of the signals $e_x$ and $e_y$ changes when, with a small deflection of the steering lever 1, one moves its direction a full time round (from 0° to 360°). The appearance of the curves is not here affected by the limitation edges 3a, 3b, 3c and 3d, but will take sinusvidal form becuase of the steering mechanics of the steering lever 1.

By means of the steering system described the maximum speed of the vehicle 35 is limited upon travel in a direction deviating from a travelling direction substantially parallel and/or perpendicular to the axles 43 of the wheels H1–H4, in which travelling direction the vehicle 35 can attain its maximum travelling speed. Operation of the steering lever of the steering device will control the torque of the drive units 36–39 of the drive. Maneuvering of the vehicle 35 is facilitated by the fact that the steering lever 1 can take four distinct steering lever positions for travel in the main travelling directions.

The drive comprising the drive units 36–39 is preferably variable to permit variation of the maximum travelling speed of the vehicle 35 upon travel in a given direction. Further, the guide plate 2 may be exchanged for another guide plate with otherwise arranged guide edges for variation of the maximum travelling speed of the vehicle upon travel in a given direction.

The drive 36–39 may preferably be dimensioned so as to provide a maximum vehicle speed which is limited upon travel in a travelling direction deviating from a travelling direction substantially parallel and/or perpendicular to the shafts 43 of the wheels H1–H4, in which travelling direction the vehicle 35 can attain its maximum travelling speed. The drive 36–39 may include or be operable by means of a program for automatic control of the drive. The drive 36–39 may further be so dimensioned that the maximum speed upon travel or conveyance describing a curving path is limited with regard to the maximum speed on a corresponding straight path obtained by the same steering lever deflection without rotation.

Alternatively, the steering device controls the torque of the drive 36–39 resulting in that the maximum speed upon travel or conveyance describing a curving path is limited with regard to the maximum speed on a corresponding straight path obtained by the same steering lever deflection without rotation.

The invention is not restricted to the embodiment described above and illustrated in the drawings. Thus, the invention is applicable not only to vehicles which are to carry, pull or push loads in optional directions, but also to stationary or mobile conveyers on which loads are to be moved in optional directions. These vehicles or conveyers may present two or more wheels H1–H4 with rollers 41 or several other types of drive means and/or other types of ground contact elements than rollers. Various types of driven means with ground contact elements for driving vehicles in optional directions are disclosed in Swedish Patent 363 781, but the driven means and ground contact elements can be embodied in accordance with further alternatives for driving in optional directions. The steering device and/or the drive may be embodied in many different ways for providing the said limitation of the maximum speed in directions other than the main travelling directions. It is essential that the various units are so embodied that the vehicles or the conveyers can be driven in optional directions and exploit the full power of the drive upon travel in the main travelling directions.

The drive may include an electric motor with gearbox for each driven means. Said gearbox may have two gears, viz. a low gear for travel in optional directions and a high gear for travel in the main travelling directions, the power required being lowest upon travel in the main travelling directions. As a result of this change-speed gear the drive 36–39 will be variable, but this can alternatively be achieved in another manner.

The drive 36–39 may be either of the mechanical, hydraulic or electric type.

I claim:

1. Steering device for controlling the traveling direction and speed of vehicles, which vehicles are movable in optimal directions including directions along a straight path deviating from main traveling direction of straight forward, straight backward, straight to the right and straight to the left and have at least two driven means with oblique ground contact elements, the steering device comprising means for generatiang control signals which control the direction of rotation ans speed of drive units for individual driving of the driven means of the vehicle, whereby said steering device controls the traveling direction and speed of the vehicle, said means for generating control signals further including means to generate control signals of a limited magnitude for controlling the speed of the drive units when the steering device generates control signals for driving the vehicle in directions along a straight path deviating from the main traveling directions of the vehicle to limit the magnitude of the control signals for controlling the speed of the drive units relative to the magnitude of the control signals for controlling the speed of the drive units when the steering device generates control signals for driving the vehicle in the main traveling directions.

2. Steering device according to claim 1 further comprising a program for automatic control of the vehicle, which program is operatively coupled with said means for generating control signals.

3. Steering device according to claim 1 wherein said means for generating control signals of a limited magnitude comprises a steering lever and limitation surfaces provided by edges of an opening in which the lever is movable, said edges limiting deflection of said lever when said lever is moved from a neutral position in directions for generating control signals for driving the vehicle in directions deviating from the main traveling directions and said opening permitting a larger deflection of the lever when said lever is moved from the neutral position in directions for driving the vehicle in the main traveling directions.

4. Steering device according to claim 3 wherein said edges providing said limitation surfaces define a square opening for said lever, said square opening having corners, said lever being movable from the neutral position to each corner formed by the square opening, so that the direction of movement of the lever from said neutral position to said corners permits generation of control signals for controlling the vehicle in the main traveling directions and the size of the movement permits provision of the maximum speed of the driving units for driving the vehicle with maximum speed in the main traveling directions.

* * * * *